United States Patent
Saito

(10) Patent No.: US 10,457,282 B2
(45) Date of Patent: Oct. 29, 2019

(54) VEHICLE TRAVELING CONTROL DEVICE

(71) Applicant: Toyota Jidosha Kabushiki Kaisha, Toyota-shi, Aichi-ken (JP)

(72) Inventor: Yasuyuki Saito, Shizuoka-ken (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/495,029

(22) Filed: Apr. 24, 2017

(65) Prior Publication Data
US 2017/0327114 A1 Nov. 16, 2017

(30) Foreign Application Priority Data

May 11, 2016 (JP) ................. 2016-095484

(51) Int. Cl.
| | |
|---|---|
| *B60W 30/14* | (2006.01) |
| *B60W 30/16* | (2012.01) |
| *B60W 30/18* | (2012.01) |
| *B60W 10/30* | (2006.01) |
| *B60W 30/02* | (2012.01) |

(52) U.S. Cl.
CPC ............ *B60W 30/16* (2013.01); *B60W 30/18* (2013.01); *B60W 10/30* (2013.01); *B60W 30/025* (2013.01); *B60W 2420/42* (2013.01); *B60W 2420/52* (2013.01); *B60W 2540/10* (2013.01); *B60W 2540/12* (2013.01); *B60W 2550/308* (2013.01)

(58) Field of Classification Search
None
See application file for complete search history.

(56) References Cited

U.S. PATENT DOCUMENTS

| | | |
|---|---|---|
| 6,353,788 B1 | 3/2002 | Baker et al. |
| 2003/0163239 A1 | 8/2003 | Winner et al. |
| 2015/0100217 A1 | 4/2015 | Sudou et al. |

FOREIGN PATENT DOCUMENTS

| | | |
|---|---|---|
| DE | 19821122 A1 | 6/1999 |
| JP | 2002166746 A | 6/2002 |
| JP | 2002211270 A | 7/2002 |
| JP | 2003-025868 A | 1/2003 |
| JP | 2004525814 A | 8/2004 |
| JP | 2012-001042 A | 1/2012 |
| JP | 2015072604 A | 4/2015 |

*Primary Examiner* — Tamara L Weber
(74) *Attorney, Agent, or Firm* — Dinsmore & Shohl LLP

(57) ABSTRACT

A vehicle traveling control device includes an electronic control unit and an actuator. The electronic control unit is configured to specify a tracked preceding vehicle and calculate a tracking target acceleration. The electronic control unit is configured to select the tracking target acceleration as a final target acceleration when a blinker operation is not executed, and select a first acceleration equal to or higher than the tracking target acceleration as the final target acceleration when the blinker operation is executed. The electronic control unit is configured to select a second acceleration lower than the first acceleration as the final target acceleration when a vehicle speed of the passing lane preceding vehicle is equal to or lower than that of the host vehicle. The actuator is configured to control the host vehicle such that an actual acceleration of the host vehicle approaches the final target acceleration.

3 Claims, 7 Drawing Sheets

FIG. 4

| CASE | PRESENCE OR ABSENCE OF TRACKED PRECEDING VEHICLE | PRESENCE OR ABSENCE OF PASSING LANE PRECEDING VEHICLE AND CONDITION | CONTROL CONTENT OF HOST VEHICLE |
|---|---|---|---|
| CASE 1 | PRESENCE | ABSENCE | IN CASE WHERE HOST VEHICLE IS NOT ACCELERATING, ACCELERATE IN CONJUNCTION WITH BLINKER OF HOST VEHICLE (DECREASE TARGET INTER-VEHICLE DISTANCE) IN CASE WHERE HOST VEHICLE IS ACCELERATING, MAINTAIN ACCELERATION (ACCELERATE AT TRACKING TARGET ACCELERATION) (NO ACTION ACCORDING TO BLINKER ON) |
| CASE 2 | PRESENCE | PRESENCE $V_o > V_j$ | SAME AS CASE 1 |
| CASE 3 | PRESENCE | PRESENCE $V_o \leq V_j$ | IN CASE WHERE HOST VEHICLE IS NOT ACCELERATING, NOT ACCELERATE EVEN IF BLINKER IS ON (NO ACTION ACCORDING TO BLINKER ON) (TRAVEL AT TRACKING TARGET ACCELERATION) IN CASE WHERE HOST VEHICLE IS ACCELERATION, SUPPRESS ACCELERATION (SET TARGET ACCELERATION TO "0") |
| CASE 4 | ABSENCE | PRESENCE $V_o > V_j$ | MAINTAIN STATE (TARGET ACCELERATION) IMMEDIATELY BEFORE BLINKER OF HOST VEHICLE IS ON<br>(a) IN CASE WHERE HOST VEHICLE IS TRAVELING AT CONSTANT SPEED ⇒ MAINTAIN SPEED<br>(b) IN CASE WHERE HOST VEHICLE IS ACCELERATING ⇒ MAINTAIN ACCELERATION<br>(c) IN CASE WHERE HOST VEHICLE IS DECELERATING ⇒ MAINTAIN DECELERATION |
| CASE 5 | ABSENCE | PRESENCE $V_o \leq V_j$ | SAME AS CASE 3 |
| CASE 6 | ABSENCE | ABSENCE | SAME AS CASE 4 |

VEHICLE TRAVELING CONTROL DEVICE

CROSS-REFERENCE TO RELATED APPLICATIONS

The present disclosure claims priority to Japanese Patent Application No. 2016-095484 filed on May 11, 2016 which is incorporated herein by reference in its entirety including the specification, drawings and abstract.

BACKGROUND

1. Technical Field

The present disclosure relates to a vehicle traveling control device.

2. Description of Related Art

One of this kind of vehicle traveling control device (hereinafter, referred to as a "relevant device") executes adaptive cruise control (ACC) (inter-vehicle distance tracking control). That is, the relevant device makes a host vehicle travel such that an inter-vehicle distance between a tracked preceding vehicle and the host vehicle is maintained at a predetermined target inter-vehicle distance. In addition, if a driver informs the relevant device of a desire for passing by operating a blinker switch (direction indicator operation switch) for passing, the relevant device temporarily decreases the target inter-vehicle distance to a certain specific minimum value. As a result, the host vehicle is automatically accelerated for preparation for passing. With this control, since the driver easily joins the flow of traffic of a passing lane, it is possible to shorten a distance required for passing (for example, see DE Patent Application Publication No. 19821122).

SUMMARY

However, according to the relevant device, since the host vehicle is accelerated without consideration of the presence and traveling state of a preceding vehicle (hereinafter, referred to as a "passing lane preceding vehicle") traveling on the passing lane, there is a concern that various problems occur. For example, in a case where the vehicle speed of the passing lane preceding vehicle is lower than the vehicle speed of the host vehicle, at the time when the host vehicle ends a lane change to the passing lane, the inter-vehicle distance between the host vehicle and the passing lane preceding vehicle (in this case, a preceding vehicle traveling on the same lane as the host vehicle) is excessively shortened. As a result, the host vehicle needs to be rapidly decelerated, and in a case where the rapid deceleration is performed automatically, there is a concern that the driver feels a sense of discomfort.

The present disclosure provides a vehicle traveling control device capable of reducing a possibility that a driver feels a sense of discomfort by appropriately controlling an acceleration of a host vehicle according to a vehicle speed of a passing lane preceding vehicle when a blinker switch is operated to perform passing during the ACC.

The first aspect of the disclosure provides a vehicle traveling control device. The vehicle traveling control device according to the first aspect includes: at least one electronic control unit and at least one actuator. The at least one electronic control unit is configured to specify a tracked preceding vehicle. The tracked preceding vehicle travels in front of a host vehicle, and is another vehicle that the host vehicle is to set to track. The at least one electronic control unit is configured to calculate, as a tracking target acceleration, a target acceleration of the host vehicle required for maintaining an inter-vehicle distance between the host vehicle and the tracked preceding vehicle at a predetermined first target inter-vehicle distance. The at least one electronic control unit is configured to select the tracking target acceleration as a final target acceleration in a case where a blinker operation is not executed. The blinker operation sets a blinker of the host vehicle in a state indicating a lane change to a passing lane. In a case where the blinker operation is executed, the at least one electronic control unit is configured to select, as the final target acceleration, a first acceleration equal to or higher than the tracking target acceleration at a blinker operation time at which the blinker operation is executed. In a case where a specific condition is established, which is there is a passing lane preceding vehicle travelling in front of the host vehicle on the passing lane at the blinker operation time, and it is determined that a vehicle speed of the passing lane preceding vehicle at the blinker operation time is equal to or lower than a vehicle speed of the host vehicle at the blinker operation time, the at least one electronic control unit is configured to select a second acceleration lower than the first acceleration as the final target acceleration. At least one actuator is configured to control drive power of the host vehicle such that an actual acceleration of the host vehicle approaches the final target acceleration.

According to this configuration, in a case where there is the passing lane preceding vehicle and the vehicle speed of the passing lane preceding vehicle is relatively low, since the acceleration of the host vehicle is close to the second acceleration lower than the first acceleration, acceleration of the host vehicle at an excessive acceleration is suppressed. As a result, it is possible to prevent the host vehicle from excessively approaching the passing lane preceding vehicle.

In the first aspect of the disclosure, the at least one electronic control unit may be configured to select the tracking target acceleration as the second acceleration, in a case where the actual acceleration of the host vehicle at the blinker operation time is equal to or less than zero.

In the first aspect of the disclosure, the at least one electronic control unit may be configured to select, as the first acceleration, a target acceleration of the host vehicle required for maintaining the inter-vehicle distance between the host vehicle and the tracked preceding vehicle at a second target inter-vehicle distance less than the first target inter-vehicle distance, and may be configured to select the tracking target acceleration as the second acceleration, in a case where the actual acceleration of the host vehicle at the blinker operation time is equal to or less than zero.

According to this configuration, in a case where the host vehicle is not accelerating at the blinker operation time, the blinker interlocking target acceleration Gtgtw which is defined according to the inter-vehicle distance between the tracked preceding vehicle and the host vehicle is selected as the first acceleration. Therefore, it is possible to accelerate the host vehicle in preparation for a passing operation while preventing the host vehicle from excessively approaching the tracked preceding vehicle. In addition, in a case where the host vehicle is not accelerating at the blinker operation time, the second acceleration is set to the tracking target acceleration lower than the blinker interlocking target acceleration. Therefore, since the acceleration of the host vehicle does not become excessive, it is possible to prevent the host vehicle from excessively approaching the passing lane preceding vehicle.

In the first aspect of the disclosure, the at least one electronic control unit may be configured to set the second acceleration to zero, in a case where the actual acceleration of the host vehicle at the blinker operation time is greater than zero.

In the first aspect of the disclosure, the at least one electronic control unit may be configured to select the tracking target acceleration as the first acceleration, and may be configured to set the second acceleration to zero, in a case where the actual acceleration of the host vehicle at the blinker operation time is greater than zero.

According to this configuration, in a case where the host vehicle is accelerating at the blinker operation time, since the tracking target acceleration at this time also has a positive value, the tracking target acceleration is selected as the final target acceleration (first acceleration). Therefore, it is possible to smoothly accelerate the host vehicle after the blinker operation time. In addition, in a case where the vehicle speed of the passing lane preceding vehicle at the blinker operation time is equal to or lower than the vehicle speed of the host vehicle and the host vehicle is accelerating at the blinker operation time, the second acceleration is set to zero. Therefore, since acceleration of the host vehicle is suppressed, it is possible to prevent the host vehicle from excessively approaching the passing lane preceding vehicle.

In the first aspect of the disclosure, the at least one electronic control unit may be configured to, in a case where the specific condition is established and it is determined that the vehicle speed of the passing lane preceding vehicle at the blinker operation time is higher than the vehicle speed of the host vehicle at the blinker operation time, select, as the first acceleration, the target acceleration of the host vehicle required for maintaining the inter-vehicle distance between the host vehicle and the tracked preceding vehicle to a second target inter-vehicle distance less than the first target inter-vehicle distance, when the actual acceleration of the host vehicle at the blinker operation time is equal to or less than zero, and may be configured to select the tracking target acceleration as the first acceleration, when the actual acceleration of the host vehicle at the blinker operation time is greater than zero.

According to this configuration, in a case where the vehicle speed of the passing lane preceding vehicle at the blinker operation time is higher than the vehicle speed of the host vehicle, if the host vehicle is not accelerating, the blinker interlocking target acceleration is selected as the final target acceleration, and if the host vehicle is accelerating, the tracking target acceleration is selected as the final target acceleration. Both of the blinker interlocking target acceleration and the tracking target acceleration are accelerations for maintaining the inter-vehicle distance between the host vehicle and the tracked preceding vehicle at a predetermined distance, and the blinker interlocking target acceleration is higher than the tracking target acceleration. Therefore, it is possible to smoothly accelerate the host vehicle in interlocking with the blinker operation while preventing the host vehicle from excessively approaching the tracked preceding vehicle.

The second aspect of the disclosure provides a vehicle traveling control device. The vehicle traveling control device according to the second aspect includes: at least one electronic control unit and at least one actuator. The at least one electronic control unit is configured to calculate a target acceleration of a host vehicle required for making the host vehicle travel at a target vehicle speed. In a case where a blinker operation to set a blinker of the host vehicle in a state indicating a lane change to a passing lane is not executed, the at least one electronic control unit is configured to select the target acceleration as a final target acceleration. In a case where the blinker operation is executed, the at least one electronic control unit is configured to select, as the final target acceleration, a first acceleration equal to or higher than the target acceleration at the blinker operation time at which the blinker operation is executed. In a case where a specific condition is established, which is there is a passing lane preceding vehicle travelling in front of the host vehicle on the passing lane at the blinker operation time, and it is determined that a vehicle speed of the passing lane preceding vehicle at the blinker operation time is equal to or lower than a vehicle speed of the host vehicle at the blinker operation time, the at least one electronic control unit is configured to select a second acceleration lower than the first acceleration as the final target acceleration. The at least one actuator is configured to control drive power of the host vehicle such that an actual acceleration of the host vehicle approaches to the final target acceleration.

In the above description, in order to help understanding of the present disclosure, the configuration of the disclosure corresponding to an embodiment described below is attached with names and/or symbols used in this embodiment in parentheses. However, the respective constituent elements of the present disclosure are not limited to the embodiment specified by the names and/or the symbols. Other objects, features, and attendant advantages of the present disclosure will be easily understood from the description of the embodiment of the present disclosure described referring to the following drawings.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is a table in which contents of blinker interlocking control to be executed by the driving assist ECU shown in FIG. 2 are described;

DETAILED DESCRIPTION OF EMBODIMENTS

Figure 1:
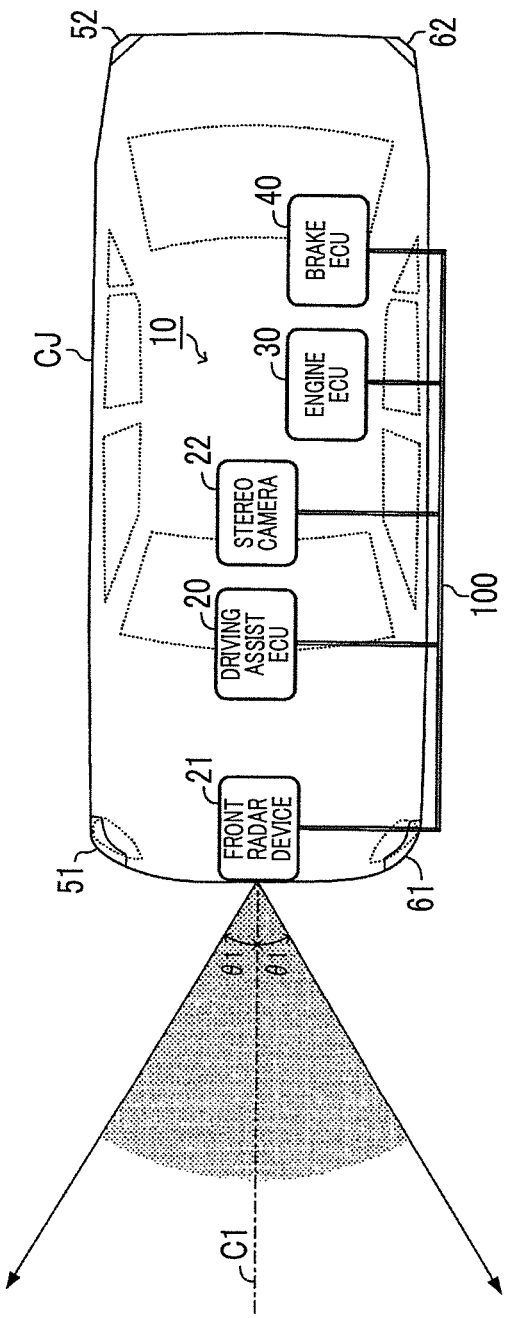
FIG. 1 is a schematic configuration diagram of a vehicle traveling control device according to an embodiment of the present disclosure.

Hereinafter, a vehicle traveling control device according to an embodiment of the present disclosure will be described referring to the drawings. First, principal terms used in the specification and the drawings will be described.

Host vehicle: own vehicle (vehicle of interest)

Another vehicle: vehicle other than host vehicle

Tracked preceding vehicle: another vehicle which is detected by a front radar device and/or a stereo camera mounted in the host vehicle and is traveling immediately in front of the host vehicle and that the host vehicle should track with controlling the acceleration of the host vehicle such that the host vehicle maintains the inter-vehicle distance from another vehicle at a predetermined target inter-vehicle distance in the ACC Passing lane preceding vehicle: another vehicle which is traveling on a passing lane adjacent to a traveling lane (lane) of the host vehicle and is present diagonally in front of the host vehicle (Configuration) As shown in FIG. 1, a vehicle traveling control device (hereinafter, referred to as a "control device") 10 according to the embodiment of the present disclosure is mounted in a host vehicle CJ. The control device 10 includes a driving assist ECU 20, an engine ECU 30, and a brake ECU 40. These ECUs are configured to exchange data (communicate) data through a communication/sensor system controller area network (CAN) 100. The ECU is an abbreviation for an electric control unit, and is an electronic control circuit having, as a principal constituent component, a microcomputer including a CPU, a ROM, a RAM, an interface, and the like. The CPU implements various functions described below by executing instructions (routines or programs) stored in a memory (ROM).

The control device 10 includes a front radar device 21 and a stereo camera 22. The front radar device 21 and the stereo camera 22 are configured to exchange data with the driving assist ECU 20 through the CAN 100.

Figure 2:
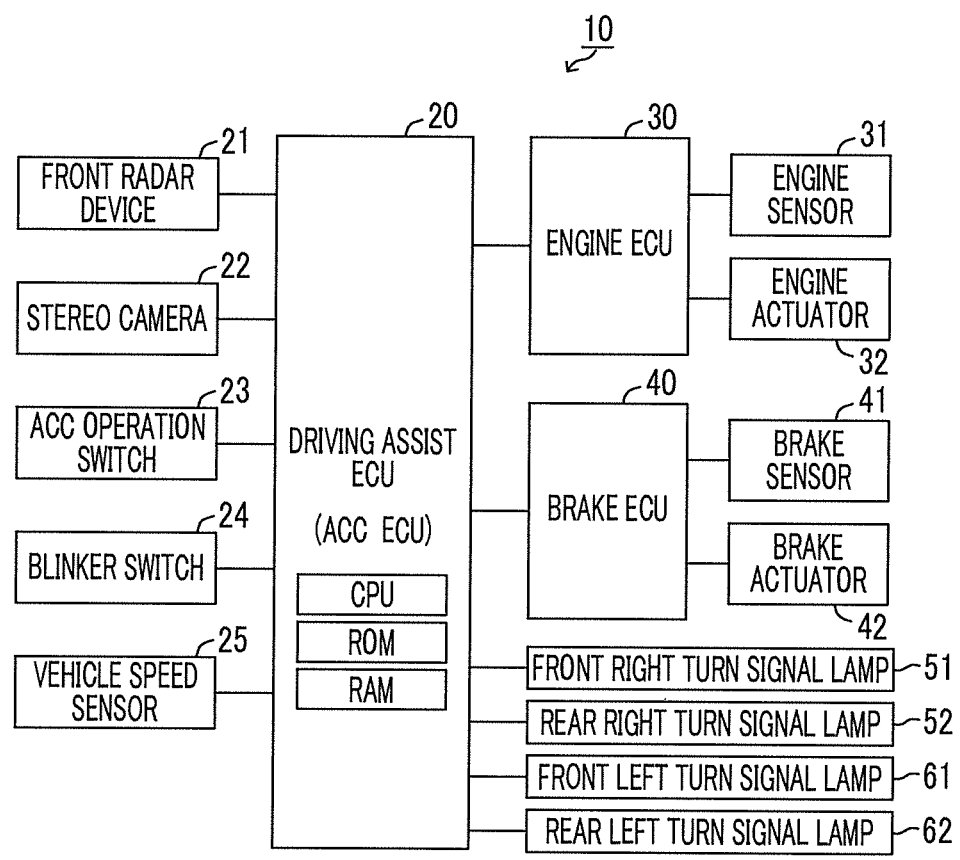
FIG. 2 is a detailed configuration diagram of the vehicle traveling control device shown in FIG. 1.

In more detail, as shown in FIG. 2, the driving assist ECU 20 is connected to the front radar device 21, the stereo camera 22, an ACC operation switch 23, a blinker switch 24, and a vehicle speed sensor 25.

The front radar device 21 includes a millimeter-wave transmission/reception unit and a processing unit. As shown in FIG. 1, the front radar device 21 is a provided in a front end portion of the host vehicle CJ and a central portion in a vehicle width direction. The millimeter-wave transmission/reception unit transmits a millimeter wave which has a center axis C1 extending in a straight front direction of the host vehicle CJ and propagates with a spread at a predetermined angle θ1 respectively in a right direction and a left direction from the center axis C1. The millimeter wave is reflected by an object (for example, another vehicle). The millimeter-wave transmission/reception unit receives a reflected wave of the millimeter wave. Hereinafter, a vehicle front along the center axis C1 is specified as an X coordinate axis, and a direction orthogonal to the center axis C1 is specified as a Y coordinate axis. The X coordinate has a positive value in a vehicle front direction and has a negative value in a vehicle rear direction. The Y coordinate has a positive value in a vehicle right direction and has a negative value in a vehicle left direction.

The processing unit of the front radar device 21 acquires an inter-vehicle distance (longitudinal distance) Dfx(n), a relative speed Vfx(n), a lateral distance Dfy(n), a relative lateral speed Vfy(n), and the like with respect to each detected object (n) based on a phase difference between a transmitted millimeter wave and a received reflected wave, an attenuation level of the reflected wave, the time until the reflected wave is received after the millimeter wave is transmitted, and the like each time a predetermined time elapses. These pieces of data (Dfx(n), Vfx(n), Dfy(n), Vfy(n), and the like) acquired by the front radar device 21 may be referred to as "front radar acquisition information" or "object information" for convenience.

The inter-vehicle distance Dfx(n) is the distance between the host vehicle CJ and the object (n) (for example, a preceding vehicle) along the center axis C1. The relative speed Vfx(n) is the difference (=SPDs−SPDj) between a speed SPDs of the object (n) (for example, a preceding vehicle) and a speed SPDj of the host vehicle CJ. The speed SPDs of the object (n) is the speed of the object (n) in a traveling direction of the host vehicle CJ. The lateral distance Dfy(n) is the distance between "a center position of the object (n) (for example, the vehicle width center position of the preceding vehicle)" and the center axis C1 in the direction orthogonal to the center axis C1. The lateral distance Dfy(n) is also referred to as a "lateral position". The relative lateral speed Vfy(n) is the relative speed of the center position of each object (n) in the direction orthogonal to the center axis C1.

Referring to FIG. 2 again, the stereo camera 22 is provided in an upper portion of a front window in the vehicle interior, acquires a stereo image straight in front of the host vehicle CJ, acquires object information from the stereo image, and recognizes a traveling lane based on white lines or the like. In addition, the stereo camera 22 acquires the position of the host vehicle with respect to the traveling lane. The driving assist ECU 20 acquires higher-accuracy object information by integrating the object information obtained from the front radar device 21 and the object information obtained from the stereo camera 22.

The ACC operation switch 23 is a switch which is operated by a driver. The ACC means inter-vehicle distance tracking control (Adaptive Cruise Control) and is simply referred to as tracking control. If the driver executes a predetermined operation using the ACC operation switch 23, an ACC start request (including a restart request) and an ACC release request (a cancel request) are generated according to the operation. In addition, a target inter-vehicle time Ttgt and a target vehicle speed Vst described below are changed or set by a predetermined operation of the ACC operation switch 23.

The blinker switch 24 is a so-called "direction indicator operation switch (lever)", and is operated by the driver when the driver changes a traveling direction of the host vehicle CJ. In a case where the driver intends to pass a preceding vehicle, the driver performs a lane change from a lane on which the host vehicle is traveling to a lane (passing lane) adjacent to the host vehicle traveling lane. In general, the driver turns on a blinker (that is, an appropriate lamp among turn signal lamps 51, 52, 61, and 62) described below by operating the blinker switch 24 immediately before performing the lane change, and thus, indicates the host vehicle performing the lane change to other vehicles.

The vehicle speed sensor 25 detects the speed (host vehicle speed) Vj of the host vehicle CJ and outputs a signal representing the host vehicle speed Vj.

The engine ECU 30 is connected to a plurality of engine sensors 31 and is configured to receive detection signals of these sensors. The engine sensors 31 are sensors which detect an operation state amount of "a gasoline fuel injection type spark-ignition internal combustion engine as a drive source of the host vehicle CJ" (not shown). The engine sensors 31 include an accelerator pedal operation amount sensor, a throttle valve opening sensor, an engine rotation speed sensor, an intake air amount sensor, and the like.

In addition, the engine ECU 30 is connected to engine actuators 32, such as a throttle valve actuator and a fuel injection valve. The engine ECU 30 is configured to change torque generated by the internal combustion engine by driving the engine actuators 32, and thus, to control the acceleration of the host vehicle CJ by adjusting the drive power of the host vehicle CJ.

The brake ECU 40 is connected to a plurality of brake sensors 41 and is configured to receive detection signals of these sensors. The brake sensors 41 are sensors which detect parameters used when controlling "a braking device (hydraulic frictional braking device) (not shown) mounted in the host vehicle CJ". The brake sensors 41 include a brake pedal operation amount sensor, a wheel speed sensor which detects the rotation speed of each wheel, and the like.

In addition, the brake ECU 40 is connected to a brake actuator 42. The brake actuator 42 is a hydraulic control actuator. The brake actuator 42 is provided in a hydraulic circuit between a master cylinder which pressurizes hydraulic oil with depression force of the brake pedal and a friction brake device including a well-known wheel cylinder provided in each wheel (all are not shown). The brake actuator 42 adjusts a hydraulic pressure supplied to the wheel cylinder. The brake ECU 40 is configured to generate braking force (friction braking force) in each wheel by driving the brake actuator 42 and to control the acceleration (negative acceleration, that is, deceleration) of the host vehicle CJ.

In addition, the driving assist ECU 20 is connected to a front right turn signal lamp 51, a rear right turn signal lamp 52, a front left turn signal lamp 61, and a rear left turn signal lamp 62. As is well known, the front right turn signal lamp 51 is provided on the right side of the vehicle body front end portion of the host vehicle CJ, and the rear right turn signal lamp 52 is provided on the right side of the vehicle body rear end portion. In addition, the front left turn signal lamp 61 is provided on the left side of the vehicle body front end portion, and the rear left turn signal lamp 62 is provided on the left side of the vehicle body rear end portion.

If the position of the blinker switch 24 is operated to a position for a right direction, the driving assist ECU 20 is configured to turn on the front right turn signal lamp 51 and the rear right turn signal lamp 52. In addition, if the position of the blinker switch 24 is operated to a position for a left direction, the driving assist ECU 20 is configured to turn on the front left turn signal lamp 61 and the rear left turn signal lamp 62.

(Outline of operation) Next, the outline of operation of the control device will be described. Hereinafter, description will be provided assuming a country where laws and regulations are prescribed to allow a vehicle to move on the left side, and thus, a passing lane is set on the right side with respect to a traveling lane.

Figure 3:
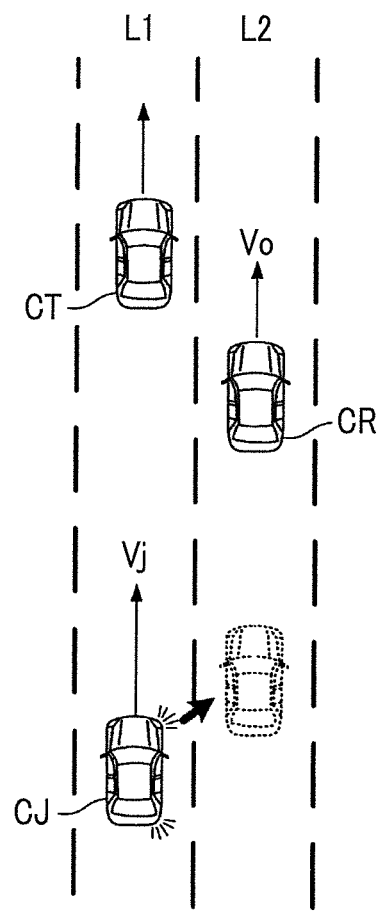
FIG. 3 is a diagram illustrating operation of a driving assist ECU shown in FIG. 2.

As shown in FIG. 3, the control device specifies a tracked preceding vehicle CT with respect to the host vehicle CJ based on the object information detected by the front radar device 21 and the stereo camera 22 in a case where the ACC operation switch 23 is operated and the ACC (inter-vehicle distance tracking control) is executed. If the tracked preceding vehicle CT is specified, the control device computes (calculates) a tracking target acceleration Gtgta required for maintaining a first target inter-vehicle distance with respect to the tracked preceding vehicle CT. The control device selects the tracking target acceleration Gtgta as a final target acceleration Gtgt if blinker interlocking control described below is not being performed.

In a case where there is no tracked preceding vehicle CT (the tracked preceding vehicle CT is not specified), the control device computes (calculates) a constant-speed traveling target acceleration Gtgtb required for maintaining the target vehicle speed Vst. The control device selects the constant-speed traveling target acceleration Gtgtb as the final target acceleration Gtgt if the blinker interlocking control described below is not being performed.

In addition, the control device transmits command signals according to the target acceleration Gtgt to the engine ECU 30 and the brake ECU 40 such that an actual acceleration of the host vehicle CJ matches the final target acceleration Gtgt, and thus, controls (drives) the engine actuators 32 and, as necessary, the brake actuator 42, respectively.

In addition, the control device starts the blinker interlocking control shown in the table of FIG. 4 in a case where the blinker switch 24 is operated while the host vehicle CJ is traveling on a traveling lane L1 and the ACC is being executed such that the blinkers (that is, the front right turn signal lamp 51 and the rear right turn signal lamp 52) on a passing lane L2 side of the host vehicle CJ are turned on.

Hereinafter, the time when the operation of the blinker switch 24 to start the blinker interlocking control is executed is simply referred to as "blinker operation time". The blinker interlocking control ends at an earlier time of the time when the host vehicle CJ ends the lane change to the passing lane and the time when the blinker switch 24 is returned to an off position (neutral position) and the blinkers are turned off.

(1) Case 1 <Case where there is the Tracked Preceding Vehicle CT and there is No Passing Lane Preceding Vehicle CR>

In this case, the control device executes the following control according to whether or not the host vehicle CJ is accelerating.

(1-A) In a case where the host vehicle CJ is not accelerating at the blinker operation time (that is, in a case where the actual acceleration of the host vehicle CJ at the blinker operation time is equal to or less than "0" and the host vehicle CJ is traveling at a constant speed or decelerating): The control device computes (calculates) the target acceleration required for maintaining "a second target inter-vehicle distance less than the first target inter-vehicle distance" with respect to the tracked preceding vehicle CT. The target acceleration is referred to as a "blinker interlocking target acceleration" for convenience. The control device selects the blinker interlocking target acceleration as the final target acceleration Gtgt. As a result, the host vehicle is accelerated at an acceleration (for convenience, referred to as a "first acceleration") higher than the acceleration at the blinker operation time.

(1-B) In a case where the host vehicle CJ is accelerating at the blinker operation time (that is, in a case where the actual acceleration of the host vehicle CJ at the blinker operation time is greater than "0"): The control device selects the tracking target acceleration Gtgta as the final target acceleration Gtgt. As a result, the host vehicle is accelerated based on the tracking target acceleration Gtgta. The acceleration in this case may also be referred to as a "first acceleration" for convenience.

(2) Case 2 <Case where there is the Tracked Preceding Vehicle CT, there is the Passing Lane Preceding Vehicle CR, and a Vehicle Speed Vo of the Passing Lane Preceding Vehicle CR at the Blinker Operation Time is Higher than a Vehicle Speed Vj of the Host Vehicle at the Blinker Operation Time>

In this case, as described below, the control device controls the host vehicle CJ in the same manner as in Case 1 described above. The control device estimates the vehicle speed Vo of the passing lane preceding vehicle by adding the vehicle speed Vj of the host vehicle to a relative speed Vfx of the passing lane preceding vehicle and the host vehicle.

(2-A) In a case where the host vehicle CJ is not accelerating at the blinker operation time, the control device selects the blinker interlocking target acceleration as the final target acceleration Gtgt.

(2-B) In a case where the host vehicle CJ is accelerating at the blinker operation time, the control device selects the tracking target acceleration Gtgta as the final target acceleration Gtgt.

(3) Case 3 <Case where there is the Tracked Preceding Vehicle CT, there is the Passing Lane Preceding Vehicle CR, and the Vehicle Speed Vo of the Passing Lane Preceding Vehicle CR at the Blinker Operation Time is Equal to or Lower than the Vehicle Speed Vj of the Host Vehicle CJ at the Blinker Operation Time>

In this case, the control device executes the following control according to whether or not the host vehicle CJ is accelerating.

(3-A) Case where the host vehicle CJ is not accelerating at the blinker operation time: The control device selects, as the final target acceleration Gtgt, the target acceleration (that is, the tracking target acceleration Gtgta) required for maintaining the first target inter-vehicle distance with respect to the tracked preceding vehicle CT. That is, the control device does not perform special acceleration control due to the blinker operation. The final target acceleration Gtgt in this case is referred to as a "second acceleration" for convenience.

As will be understood from comparison with Case (1-A), in a case where the host vehicle CJ is not accelerating at the blinker operation time, the second acceleration (=the tracking target acceleration for maintaining the first target inter-vehicle distance) is lower than the first acceleration (=the blinker interlocking target acceleration for maintaining the second target inter-vehicle distance), and thus, in a case where the vehicle speed of the passing lane preceding vehicle is lower than the vehicle speed of the host vehicle, acceleration of the host vehicle is suppressed. That is, in a case where the host vehicle is not accelerating at the blinker operation time, when there is no passing lane preceding vehicle, the control device accelerates the host vehicle in interlocking with the blinker operation. Meanwhile, when there is a passing lane preceding vehicle and the vehicle speed Vo of the passing lane preceding vehicle at the blinker operation time is equal to or lower than the vehicle speed Vj of the host vehicle, the control device does not accelerate the host vehicle in interlocking with the blinker operation.

(3-B) Case where the host vehicle CJ is accelerating at the blinker operation time: The control device selects "zero" as the final target acceleration Gtgt (Gtgt=0). That is, the control device makes the host vehicle travel at a constant speed. The final target acceleration Gtgt in this case is also referred to as a "second acceleration" for convenience.

As will be understood from comparison with Case (1-B), in a case where the host vehicle CJ is accelerating at the blinker operation time, and in a case where the second acceleration (=0) is lower than the first acceleration (=the tracking target acceleration Gtgta), and thus, the vehicle speed of the passing lane preceding vehicle is lower than the vehicle speed of the host vehicle, acceleration of the host vehicle is suppressed. That is, in a case where the host vehicle is accelerating at the blinker operation time, when there is no passing lane preceding vehicle, the control device maintains the acceleration state of the host vehicle. Meanwhile, in a case where there is a passing lane preceding vehicle and the vehicle speed Vo of the passing lane preceding vehicle at the blinker operation time is equal to or lower than the vehicle speed Vj of the host vehicle, the control device does not accelerate the host vehicle and makes the host vehicle travel at a constant speed.

In addition, as will be understood from comparison with Case (2-A) and Case (3-A), in a case where the host vehicle is not accelerating at the blinker operation time, when the vehicle speed Vo of the passing lane preceding vehicle is higher than the vehicle speed Vj of the host vehicle, the control device accelerates the host vehicle based on the blinker interlocking target acceleration in interlocking with the blinker operation. Meanwhile, in a case where the vehicle speed Vo of the passing lane preceding vehicle is equal to or lower than the vehicle speed Vj of the host vehicle, the control device does not accelerate the host vehicle in interlocking with the blinker operation.

In addition, as will be understood from comparison with Case (2-B) and Case (3-B), in a case where the host vehicle is accelerating at the blinker operation time, when the vehicle speed Vo of the passing lane preceding vehicle is higher than the vehicle speed Vj of the host vehicle, the control device maintains the acceleration state of the host vehicle (accelerates the host vehicle based on the tracking target acceleration). Meanwhile, in a case where the vehicle speed Vo of the passing lane preceding vehicle is equal to or lower than the vehicle speed Vj of the host vehicle, the control device suppresses acceleration of the host vehicle and makes the host vehicle at a constant speed.

(4) Case 4 <Case where there is No Tracked Preceding Vehicle CT, there is the Passing Lane Preceding Vehicle CR, and the Vehicle Speed Vo of the Passing Lane Preceding Vehicle CR at the Blinker Operation Time is Higher than the Vehicle Speed Vj of the Host Vehicle CJ at the Blinker Operation Time>

In this case, the control device maintains the constant-speed traveling target acceleration Gtgtb immediately before the blinker operation time, thereby maintaining the acceleration state. Specifically, the control device is operated as follows.

(a) In a case where the host vehicle CJ is traveling at a constant speed (acceleration=0) at the blinker operation time, the control device maintains the final target acceleration Gtgt at zero, thereby maintaining constant-speed traveling.

(b) In a case where the host vehicle CJ is accelerating at the blinker operation time, the control device maintains the final target acceleration Gtgt at the constant-speed traveling target acceleration Gtgtb at the blinker operation time, thereby maintaining the acceleration of the host vehicle constant.

(c) In a case where the host vehicle CJ is decelerating at the blinker operation time, the control device maintains the final target acceleration Gtgt at the constant-speed traveling target acceleration Gtgtb at the blinker operation time, thereby maintaining the deceleration of the host vehicle constant.

(5) Case 5 <Case where there is No Tracked Preceding Vehicle CT, there is the Passing Lane Preceding Vehicle CR, and the Vehicle Speed Vo of the Passing Lane Preceding Vehicle CR at the Blinker Operation Time is Equal to or Lower than the Vehicle Speed Vj of the Host Vehicle CJ at the Blinker Operation Time>

In this case, as described below, the control device controls the host vehicle in the same manner as in Case 3 described above.

(5-A) Case where the host vehicle CJ is not accelerating at the blinker operation time: The control device selects the constant-speed traveling target acceleration Gtgtb as the final target acceleration Gtgt. That is, the control device does not perform special acceleration control due to the blinker operation.

(5-B) Case where the host vehicle CJ is accelerating at the blinker operation time: The control device selects "zero" as the final target acceleration Gtgt (Gtgt=0). That is, the control device makes the host vehicle travel at a constant speed.

(6) Case 6 <Case where there is No Tracked Preceding Vehicle CT and there is No Passing Lane Preceding Vehicle CR>

In this case, the control device controls the host vehicle CJ in the same manner as in Case 4 described above. That is, the control device maintains the constant-speed traveling target acceleration Gtgtb immediately before the blinker operation time, thereby maintaining the acceleration state.

(Specific operation) The CPU (hereinafter, the term "CPU" used herein indicates the CPU of the driving assist ECU 20 unless otherwise noted) of the driving assist ECU 20 is configured to execute routines shown in the flowcharts of FIGS. 5 to 7 until ACC release conditions are established each time a given time is elapses if the ACC operation switch 23 is operated in a state where the inter-vehicle distance tracking control is not executed, and the ACC start request is generated. The ACC release conditions are established in a case where the ACC operation switch 23 is operated and the ACC release request is generated, a case where the brake pedal operation amount sensor detects that the brake pedal is depressed, and the like.

Normal Processing

Figure 5:
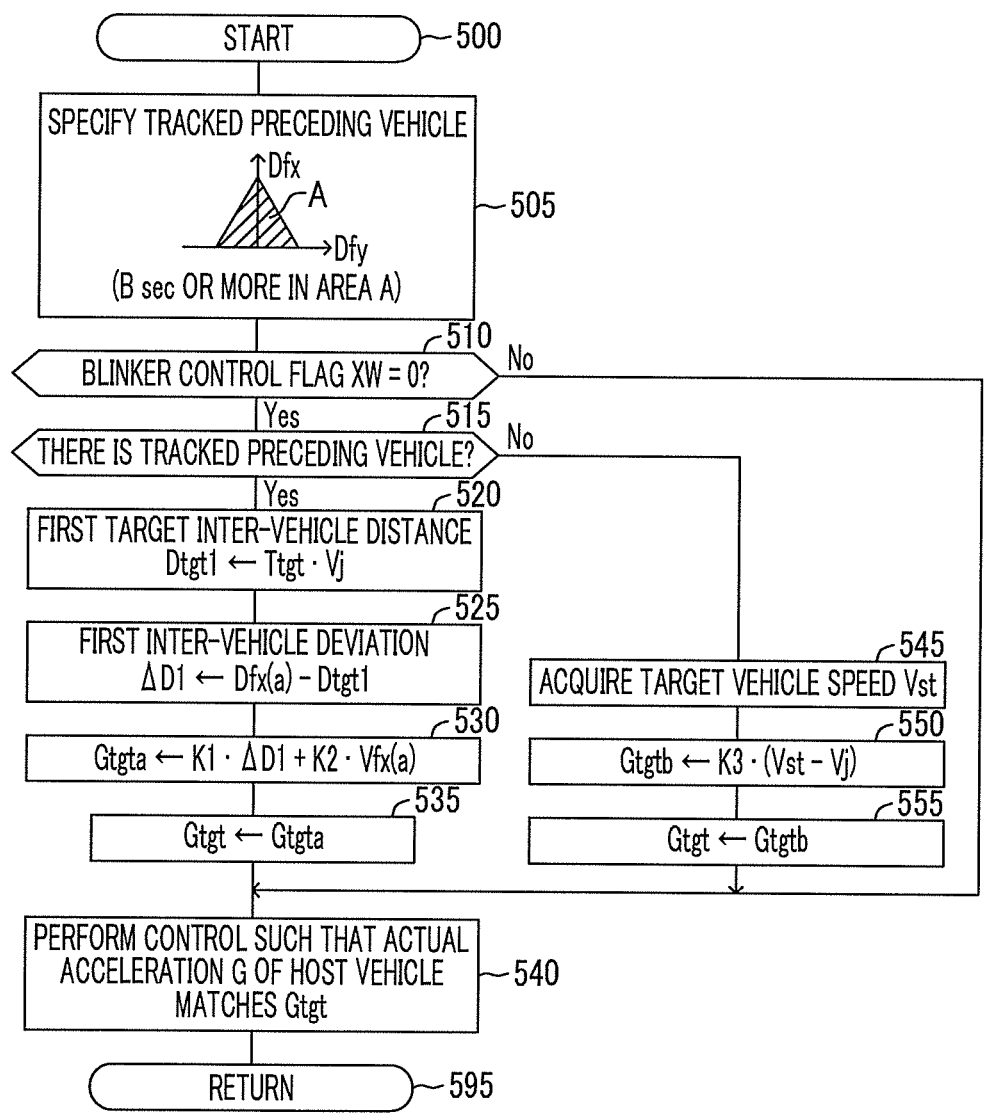
FIG. 5 is a flowchart showing a routine to be executed by a CPU of the driving assist ECU shown in FIG. 2.

If a predetermined timing is reached, the CPU starts processing from Step 500 of FIG. 5 and progresses to Step 505, and specifies (selects) a tracked preceding vehicle based on the object information acquired by the front radar device 21 and the stereo camera 22. A specification method of a tracked preceding vehicle is well known, for example, as disclosed in Japanese Patent Application Publication No. 2015-072604 (JP 2015-072604 A). In brief, the CPU applies the lateral distance Dfy(n) and the inter-vehicle distance Dfx(n) to a map shown in Step 505 of FIG. 5 to specify another vehicle (n) which is present in a tracked preceding vehicle area A of the map, and in a case where another vehicle (n) is present in the tracked preceding vehicle area continuously over a predetermined time, selects and specifies another vehicle (n) as a tracked preceding vehicle (a). In a case where there are a plurality of other vehicles in the tracked preceding vehicle area A of the map, the CPU specifies another vehicle at the shortest inter-vehicle distance Dfx(n) as the tracked preceding vehicle.

Next, the CPU progresses to Step 510 and determines whether or not the value of a blinker control flag XW is "0". The value of the flag XW is set to "0" in an initial routine which is executed by the CPU when an ignition key switch (not shown) is changed from an off position to an on position. The value of the flag XW is set to "1" when the blinker interlocking control is started in the routine shown in FIG. 6, and is set to "0" when the blinker interlocking control ends in the routine shown in FIG. 7.

In a case where the value of the flag XW is not "0", the CPU determines to be "No" in Step 510 and progresses to Step 540 described below. In contrast, in a case where the value of the flag XW is "0", the CPU determines to be "Yes" in Step 510, progresses to Step 515, and in Step 505, determines whether or not the tracked preceding vehicle (a) is specified (is present). In a case where the tracked preceding vehicle (a) is specified, the CPU determines "Yes" in Step 515, performs processing of Steps 520 to 540 described below in order, and progresses to Step 595 to end this routine once.

Step 520: The CPU calculates a first target inter-vehicle distance Dtgt1 by multiplying the target inter-vehicle time Ttgt by the speed Vj of the host vehicle. The target inter-vehicle time Ttgt is set separately by an operation of the ACC operation switch 23, but may be a fixed value.

Step 525: The CPU calculates a first inter-vehicle deviation ΔD1 by subtracting the first target inter-vehicle distance Dtgt1 from an inter-vehicle distance Dfx(a) of the tracked preceding vehicle (a) selected in Step 505 according to Expression (1) described below.

$$\Delta D1 = Dfx(a) - Dtgt1 \qquad (1)$$

Step 530: The CPU calculates the tracking target acceleration Gtgta according to Expression (2) described below. In Expression (2), Vfx(a) is the relative speed of the tracked preceding vehicle (a) selected in Step 505, and K1 and K2 are predetermined positive gains (coefficients). With the above, the tracking target acceleration Gtgta is calculated (determined).

$$Gtgta = K1 \cdot \Delta D1 + K2 \cdot Vfx(a) \qquad (2)$$

Step 535: The CPU selects the tracking target acceleration Gtgta as the final target acceleration Gtgt. That is, the CPU sets the tracking target acceleration Gtgta as the final target acceleration Gtgt.

Step 540: The CPU transmits the target acceleration Gtgt to the engine ECU 30 and the brake ECU 40 such that an actual acceleration Ga of the host vehicle matches the target acceleration Gtgt. The engine ECU 30 and the brake ECU 40 respectively control (drive) the engine actuators 32 and the brake actuator 42 according to the target acceleration Gtgt and the actual acceleration Ga (=dVj/dt) of the host vehicle. As a result, the actual acceleration Ga of the host vehicle matches the target acceleration Gtgt. The CPU acquires the actual acceleration Ga by dividing a value obtained by subtracting a speed Vjold of the host vehicle acquired a given time ts ago from the current vehicle speed Vj of the host vehicle by the time ts (Ga=(Vj−Vjold)/ts).

At the time when the CPU performs the processing of Step 515, in a case where the tracked preceding vehicle (a) is not specified (is absent), the CPU determines to be "No" in Step 515, performs processing of Steps 545 to 555 described below in order, and thereafter, progresses to Step 540.

Step 545: The CPU acquires the target vehicle speed (set vehicle speed) Vst. The target vehicle speed Vst is set based on the operation of the ACC operation switch 23 and the vehicle speed Vj of the host vehicle by the CPU executing a routine (not shown). For example, the target vehicle speed Vst is set to the vehicle speed Vj of the host vehicle at the time when the ACC operation switch 23 is operated (that is, the time when the ACC start request is generated) in a state where the inter-vehicle distance tracking control is not executed. In addition, the target vehicle speed Vst is increased or decreased based on the number of operations of the ACC operation switch 23 in a period during which the ACC is executed.

Step 550: The CPU calculates (determines) the constant-speed traveling target acceleration Gtgtb by multiplying a value obtained by subtracting the vehicle speed Vj of the host vehicle from the target vehicle speed Vst by a predetermined positive gain K3 according to Expression (3) described below.

$$Gtgtb = K3 \cdot (Vst - Vj) \qquad (3)$$

Step 555: The CPU selects the constant-speed traveling target acceleration Gtgtb as the final target acceleration Gtgt. That is, the CPU sets the constant-speed traveling target acceleration Gtgtb as the final target acceleration Gtgt. With the above-described processing, in a case where the value of the flag XW is "0", the acceleration of the host vehicle is controlled based on either of the tracking target acceleration Gtgta or the constant-speed traveling target acceleration Gtgtb.

Blinker Interlocking Control Start Processing

Figure 6:
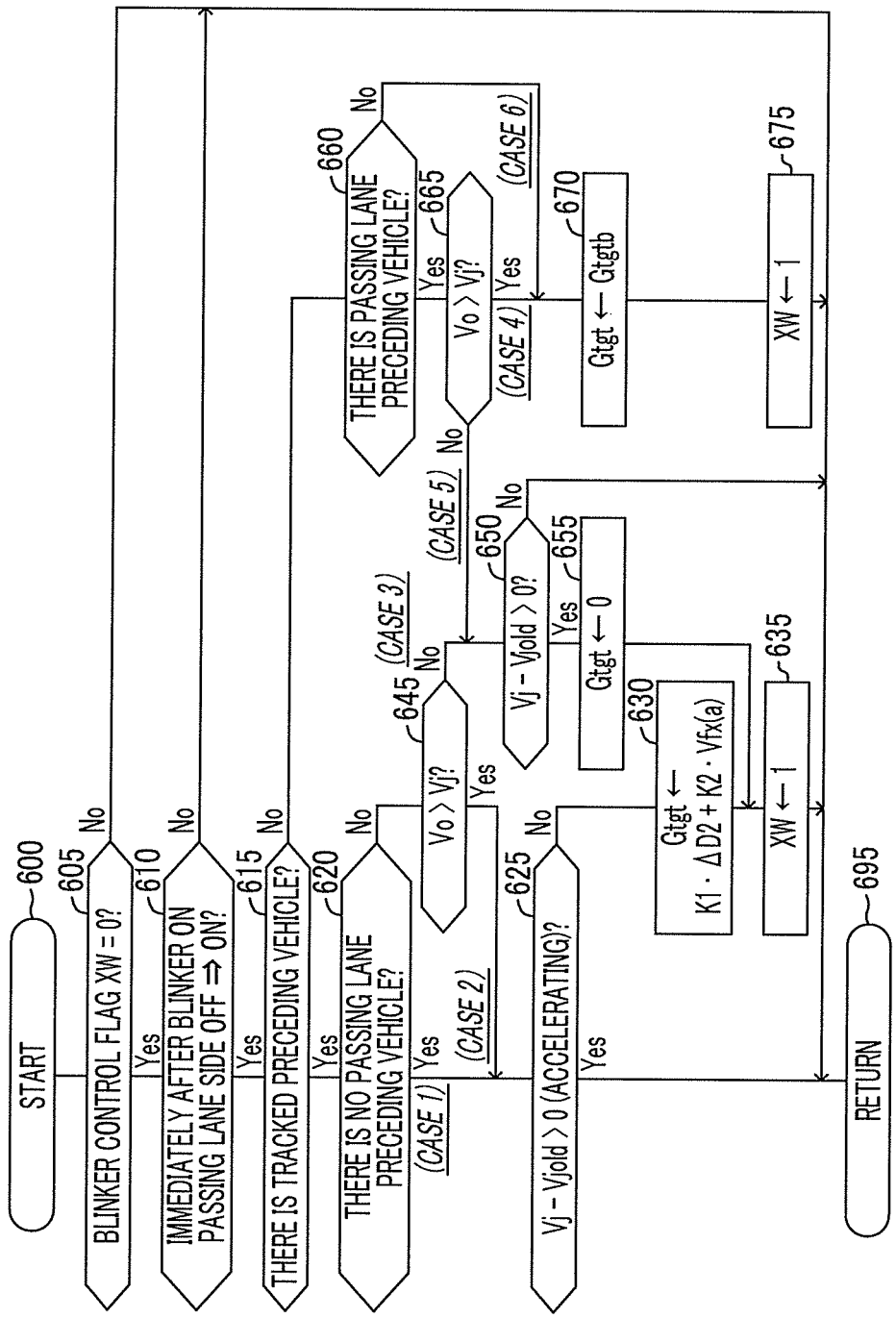
FIG. 6 is a flowchart showing a routine to be executed by the CPU of the driving assist ECU shown in FIG. 2.

If a predetermined timing is reached, the CPU starts processing from Step 600 of FIG. 6, progresses to Step 605, and determines whether or not the value of the blinker control flag XW is "0". In a case where the value of the flag XW is not "0", the CPU determines to be "No" in Step 605 and progresses directly to Step 695 to end this routine once.

In contrast, in a case where the value of the flag XW is "0", the CPU determines to be "Yes" in Step 605, progresses to Step 610, and determines whether or not the present time is "the time immediately after the blinker switch 24 is changed from the off state to the on state (that is, the time immediately after the blinker operation time)". In a case where the present time is not the time immediately after the blinker operation time, the CPU determines to be "No" in Step 610 and progresses directly to Step 695 to end this routine once.

In contrast, in a case where the present time is the time immediately after the blinker operation time, the CPU determines to be "Yes" in Step 610, progresses to Step 615, and determines whether or not a tracked preceding vehicle is present. In other words, in Step 615, the CPU determines whether or not the present time is "the time when the inter-vehicle distance tracking control is being executed for calculating the tracking target acceleration Gtgta required for maintaining the first target inter-vehicle distance Dtgt1 with respect to the tracked preceding vehicle and controlling the drive power and/or braking force of the host vehicle such that the actual acceleration of the host vehicle matches the tracking target acceleration Gtgta.

Hereinafter, the operation of the CPU for each case described above will be described.

1. Case 1

Case 1 is a case where a tracked preceding vehicle is present. Accordingly, the CPU determines to be "Yes" in Step 615, progresses to Step 620, and determines whether or not a passing lane preceding vehicle is absent based on the above-described object information.

Case 1 is a case where a passing lane preceding vehicle is absent. Accordingly, the CPU determines to be "Yes" in Step 620, progresses to Step 625, and determines whether or not the host vehicle is accelerating. Specifically, the CPU determines whether or not the value obtained by subtracting the speed Vjold of the host vehicle acquired the given time is ago from the current vehicle speed Vj of the host vehicle is greater than "0" (is a positive value).

In a case where the host vehicle is not accelerating at the blinker operation time (1-A described above), the CPU determines to be "No" in Step 625, progresses to Step 630, and calculates the blinker interlocking target acceleration Gtgtw to be the final acceleration Gtgt according to Expression (4) described below. In Expression (4), Vfx(a) is the relative speed of the tracked preceding vehicle (a) selected in Step 505, ΔD2 is a second inter-vehicle deviation given by Expression (5) described below, and K1 and K2 are predetermined positive gains (coefficients). A second target inter-vehicle distance Dtgt2 of Expression (5) is a distance smaller than the first target inter-vehicle distance Dtgt1 (for example, Dtgt2=0.8·Dtgt1). Accordingly, immediately after the final target acceleration is changed from the tracking target acceleration Gtgta to the blinker interlocking target acceleration Gtgtw, the blinker interlocking target acceleration Gtgtw becomes higher than the tracking target acceleration Gtgta.

$$Gtgtw = Gtgt = K1 \cdot \Delta D2 + K2 \cdot Vfx(a) \quad (4)$$

$$\Delta D2 = Dfx(a) - Dtgt2 \quad (5)$$

Next, the CPU progresses to Step 635 to set the value of the flag XW to "1" and progresses to Step 695 to end this routine once. As a result, the CPU determines "No" in Step 510 of FIG. 5 and progresses directly to Step 540. Accordingly, the host vehicle is accelerated according to the target acceleration Gtgt (=the blinker interlocking target acceleration Gtgtw) calculated by Expression (4) described above.

In contrast, in a case where the host vehicle is accelerating at the blinker operation time (1-B described above), the CPU determines to be "Yes" in Step 625 and progresses directly to Step 695 to end this routine once. As a result, the CPU determines to be "Yes" in both of Steps 510 and 515 of FIG. 5, and executes processing of Steps 520 to 540. Accordingly, in this case, the tracking target acceleration Gtgta is selected as the final acceleration Gtgt. Therefore, the host vehicle is accelerated based on the tracking target acceleration Gtgta.

2. Case 2

Case 2 is a case where both of a tracked preceding vehicle and a passing lane preceding vehicle are present. Accordingly, the CPU determines to be "Yes" in Step 615, determines to be "No" in Step 620, and progresses to Step 645. In Step 645, the CPU determines whether or not the vehicle speed Vo of the passing lane preceding vehicle is higher than the vehicle speed Vj of the host vehicle at the present time being substantially the blinker operation time.

Case 2 is a case where the vehicle speed Vo of the passing lane preceding vehicle is higher than the vehicle speed Vj of the host vehicle at the blinker operation time. Accordingly, the CPU determines to be "Yes" in Step 645 and progresses to after Step 625. As a result, the same processing as in Case 1 is executed. That is, the CPU accelerates the host vehicle based on the final acceleration Gtgt (=the blinker interlocking target acceleration Gtgtw) calculated according to Expression (4) described above if the host vehicle is not accelerating, and accelerates the host vehicle based on the tracking target acceleration Gtgta if the host vehicle is accelerating.

3. Case 3

Case 3 is a case where both of a tracked preceding vehicle and a passing lane preceding vehicle are present. Accordingly, the CPU determines to be "Yes" in Step 615, determines to be "No" in Step 620, and progresses to Step 645.

Case 3 is a case where the vehicle speed Vo of the passing lane preceding vehicle is equal to or lower than the vehicle speed Vj of the host vehicle at the blinker operation time. Accordingly, the CPU determines to be "No" in Step 645, progresses to Step 650, and determines whether or not the host vehicle is accelerating. Specifically, the CPU determines whether or not the value obtained by subtracting the speed Vjold of the host vehicle acquired the given time is ago from the current vehicle speed Vj of the host vehicle is greater than "0" (is a positive value).

In a case where the host vehicle is not accelerating at the blinker operation time (3-A described above), the CPU determines to be "No" in Step 650 and progresses directly to Step 695 to end this routine once. As a result, the CPU determines to be "Yes" in both of Steps 510 and 515 of FIG.

5 and executes the processing of Steps 520 to 540. Accordingly, in this case, the tracking target acceleration Gtgta is selected as the final acceleration Gtgt. Therefore, the host vehicle is controlled based on the same tracking target acceleration Gtgta before and after the blinker operation time.

In contrast, in a case where the host vehicle is accelerating at the blinker operation time (3-B described above), the CPU determines to be "Yes" in Step 650, progresses to Step 655, and sets the final acceleration Gtgt to "0" (zero).

Next, the CPU progresses to Step 635 to set the value of the flag XW to "1" and progresses to Step 695 to end this routine once. As a result, the CPU determines to be "No" in Step 510 of FIG. 5 and progresses directly to Step 540. Accordingly, in this case, since the final acceleration Gtgt is zero, acceleration of the host vehicle is suppressed, and the host vehicle is made to travel at a constant speed.

4. Case 4

Case 4 is a case where a tracked preceding vehicle is absent. Accordingly, the CPU determines to be "No" in Step 615, progresses to Step 660, and determines whether or not a passing lane preceding vehicle is present based on the above-described object information.

Case 4 is a case where a passing lane preceding vehicle is present. Accordingly, the CPU determines to be "Yes" in Step 660, progresses to Step 665, and determines whether or not the vehicle speed Vo of the passing lane preceding vehicle is higher than the vehicle speed Vj of the host vehicle at the present time being substantially the blinker operation time.

Case 4 is a case where the vehicle speed Vo of the passing lane preceding vehicle is higher than the vehicle speed Vj of the host vehicle at the blinker operation time. Accordingly, the CPU determines to be "Yes" in Step 665, progresses to Step 670, and selects the constant-speed traveling target acceleration Gtgtb calculated according to Expression (3) described above at this time (that is, the blinker operation time) as the final acceleration Gtgt.

Next, the CPU progresses to Step 675 to set the value of the flag XW to "1" and progresses to Step 695 to end this routine once. As a result, the CPU determines to be "No" in Step 510 of FIG. 5 and progresses directly to Step 540. Accordingly, the host vehicle is made to travel according to the constant-speed traveling target acceleration Gtgtb at the blinker operation time.

5. Case 5

Case 5 is a case where a tracked preceding vehicle is absent. Accordingly, the CPU determines to be "No" in Step 615 and progresses to Step 660. Case 5 is a case where a passing lane preceding vehicle is present. Accordingly, the CPU determines to be "Yes" in Step 660 and progresses to Step 665.

Case 5 is a case where the vehicle speed Vo of the passing lane preceding vehicle is equal to or lower than the vehicle speed Vj of the host vehicle at the blinker operation time. Accordingly, the CPU determines to be "No" in Step 665 and progresses to after Step 650. As a result, the same processing as in Case 3 is executed.

That is, if the host vehicle is not accelerating (5-A described above), the CPU determines to be "No" in Step 650 and progresses directly to Step 695 to end this routine once. As a result, the CPU determines to be "Yes" in Step 510 of FIG. 5, determines to be "No" in Step 515, and executes the processing of Steps 545 to 555, and Step 540. Accordingly, in this case, the constant-speed traveling target acceleration Gtgtb is selected as the final acceleration Gtgt. Therefore, the host vehicle is controlled based on the same constant-speed traveling target acceleration Gtgtb before and after the blinker operation time.

In contrast, in a case where the host vehicle is accelerating at the blinker operation time (5-B described above), the CPU determines to be "Yes" in Step 650, progresses to Step 655, and sets the final acceleration Gtgt to "0" (zero).

Next, the CPU progresses to Step 635 to set the value of the flag XW to "1" and progresses to Step 695 to end this routine once. As a result, the CPU determines to be "No" in Step 510 of FIG. 5 and progresses directly to Step 540. Accordingly, in this case, since the final acceleration Gtgt is zero, the host vehicle is made to travel at a constant speed.

6. Case 6

Case 6 is a case where both of a tracked preceding vehicle and a passing lane preceding vehicle are absent. Accordingly, the CPU determines to be "No" in both of Steps 615 and 660 and progresses to Steps 670 and 675.

As a result, the CPU determines to be "No" in Step 510 of FIG. 5 and progresses directly to Step 540. Accordingly, the host vehicle is accelerated according to the constant-speed traveling target acceleration Gtgtb at the blinker operation time.

Blinker Interlocking Control End Processing

Figure 7:
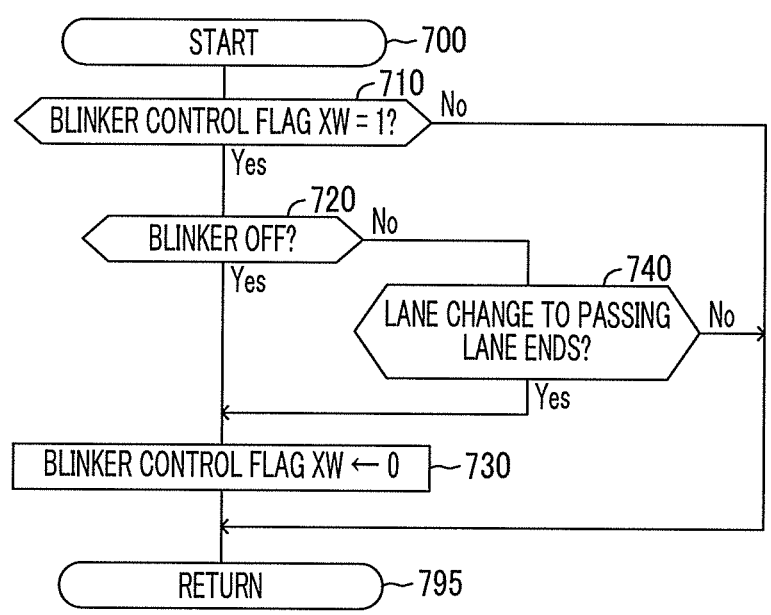
FIG. 7 is a flowchart showing a routine to be executed by the CPU of the driving assist ECU shown in FIG. 2.

If a predetermined timing is reached, the CPU starts processing from Step 700 of FIG. 7, progresses to Step 710, and determines whether or not the value of the blinker control flag XW is "1". In a case where the value of the flag XW is not "1", the CPU determines to be "No" in Step 710 and progresses directly to Step 795 to end this routine once.

In contrast, in a case where the value of the flag XW is "1", the CPU determines to be "Yes" in Step 710, progresses to Step 720, and determines whether or not the blinker switch 24 is in the off state at the present time. Then, when the blinker switch 24 is in the off state, the CPU determines to be "Yes" in Step 720 and progresses to Step 730 to set the value of the flag XW to "0". Thereafter, the CPU progresses to Step 795 to end this routine once.

In a case where the blinker switch 24 is not in the off state at the time when the CPU executes the processing of Step 720, the CPU determines to be "No" in Step 720, progresses to Step 740, and determines whether or not the host vehicle ends a lane change to a passing lane based on information obtained from a stereo image.

In a case where the host vehicle ends the lane change to the passing lane, the CPU determines to be "Yes" in Step 740, progresses to Step 730 to set the value of the flag XW to "0", and progresses to Step 795 to end this routine once.

In contrast, in a case where the host vehicle does not end the lane change to the passing lane at the time when the CPU executes the processing of Step 740, the CPU determines to be "No" in Step 740 and progresses directly to Step 795 to end this routine once.

As described above, if the blinker operation is executed during the ACC, for example, in a case where the host vehicle is not accelerating, the control device accelerates the host vehicle at the first acceleration (blinker interlocking target acceleration) which becomes temporarily higher than the tracking target acceleration. However, even in this case, the when a passing lane preceding vehicle is present and the vehicle speed of the passing lane preceding vehicle is equal to or lower than the vehicle speed of the host vehicle, the host vehicle is made to travel at the second acceleration (tracking target acceleration) lower than the first acceleration. Accordingly, it is possible to reduce a possibility that the host vehicle excessively approaches the passing lane preceding vehicle. In addition, since the blinker interlocking target acceleration is an acceleration for maintaining the inter-vehicle distance with respect to the tracked preceding vehicle at the second inter-vehicle distance, it is possible to reduce a possibility that the host vehicle excessively approaches the tracked preceding vehicle even if the host vehicle is accelerated with the blinker operation.

The present disclosure is not limited to the above-described embodiment, and various modification examples can be selected. For example, since an error may be included in the relative speed Vfx of the preceding vehicle acquired by the front radar device 21 and the stereo camera 22, the CPU may select, as the vehicle speed Vo of the passing lane preceding vehicle used in Steps 645 and 665, a value obtained by adding a positive predetermined value α to the vehicle speed of the passing lane preceding vehicle calculated from the relative speed Vfx and the vehicle speed Vj of the host vehicle so as to cope with a case where the speed of the passing lane preceding vehicle is estimated to be lower than an actual speed.

In addition, in a modification example of the control device, the target acceleration (first acceleration) set in Case 1 and Case 2 may be set to "a positive first predetermined value α1 greater than the tracking target acceleration Gtgta at this time", and the target acceleration (second acceleration) set in Case 3 may be set to "a positive second predetermined value α2 smaller than the first predetermined value α1".

What is claimed is:

1. A vehicle traveling control device comprising:
at least one electronic control unit configured to
specify a tracked preceding vehicle, the tracked preceding vehicle travelling in front of a host vehicle, the tracked preceding vehicle being another vehicle that the host vehicle is to set to track,
calculate, as a tracking target acceleration, a target acceleration of the host vehicle required for maintaining an inter-vehicle distance between the host vehicle and the tracked preceding vehicle at a predetermined first target inter-vehicle distance,
select the tracking target acceleration as a final target acceleration in a case where a blinker operation is not executed, the blinker operation setting a blinker of the host vehicle in a state indicating a lane change to a passing lane,
in a case where the blinker operation is executed, select, as the final target acceleration, a first acceleration equal to or higher than the tracking target acceleration at a blinker operation time at which the blinker operation is executed, and
in a case where a specific condition is established, the specific condition being that there is a passing lane preceding vehicle travelling in front of the host vehicle on the passing lane at the blinker operation time, and it is determined that a vehicle speed of the passing lane preceding vehicle at the blinker operation time is equal to or lower than a vehicle speed of the host vehicle at the blinker operation time, select a second acceleration lower than the first acceleration as the final target acceleration; and
at least one actuator configured to
control drive power of the host vehicle such that an actual acceleration of the host vehicle approaches the final target acceleration,
wherein the at least one electronic control unit is configured to
select, as the first acceleration, a target acceleration of the host vehicle required for maintaining the inter-vehicle distance between the host vehicle and the tracked preceding vehicle at a second target inter-vehicle distance less than the first target inter-vehicle distance, in a case where the actual acceleration of the host vehicle at the blinker operation time is equal to or less than zero,
select the tracking target acceleration as the second acceleration, in a case where the actual acceleration of the host vehicle at the blinker operation time is equal to or less than zero, and
set the second acceleration to zero, in a case where the actual acceleration of the host vehicle at the blinker operation time is greater than zero.

2. The vehicle traveling control device according to claim 1,
wherein the at least one electronic control unit is configured to
select the tracking target acceleration as the first acceleration, and
set the second acceleration to zero,
in a case where the actual acceleration of the host vehicle at the blinker operation time is greater than zero.

3. The vehicle traveling control device according to claim 1,
wherein the at least one electronic control unit is configured to,
in a case where the specific condition is established and it is determined that the vehicle speed of the passing lane preceding vehicle at the blinker operation time is higher than the vehicle speed of the host vehicle at the blinker operation time,
select, as the first acceleration, the target acceleration of the host vehicle required for maintaining the inter-vehicle distance between the host vehicle and the tracked preceding vehicle to a second target inter-vehicle distance less than the first target inter-vehicle distance, when the actual acceleration of the host vehicle at the blinker operation time is equal to or less than zero, and
select the tracking target acceleration as the first acceleration, when the actual acceleration of the host vehicle at the blinker operation time is greater than zero.

* * * * *